United States Patent
Menard

(10) Patent No.: US 7,883,217 B2
(45) Date of Patent: Feb. 8, 2011

(54) LAMP MOUNT SYSTEM FOR PROJECTOR LAMPS WITH MOUNT PIECE AND CLIPS

(75) Inventor: Peter Menard, Arvada, CO (US)

(73) Assignee: Oerlikon Trading AG, Trübbach, Trübbach (CH)

( * ) Notice: Subject to any disclaimer, the term of this patent is extended or adjusted under 35 U.S.C. 154(b) by 902 days.

(21) Appl. No.: 11/765,502

(22) Filed: Jun. 20, 2007

(65) Prior Publication Data

US 2008/0007703 A1   Jan. 10, 2008

Related U.S. Application Data

(60) Provisional application No. 60/818,649, filed on Jul. 5, 2006.

(51) Int. Cl.
*G03B 21/20* (2006.01)

(52) U.S. Cl. .......... 353/87; 353/119; 362/306; 362/310

(58) Field of Classification Search ........ 353/87, 353/119; 362/306, 310
See application file for complete search history.

(56) References Cited

U.S. PATENT DOCUMENTS

| | | |
|---|---|---|
| 4,219,870 A | 8/1980 | Haraden et al. |
| 6,056,405 A * | 5/2000 | Heintz et al. ........ 353/85 |
| 6,461,025 B1 * | 10/2002 | Payne ........ 362/374 |
| 7,241,029 B2 * | 7/2007 | Tsai ........ 362/277 |
| 2004/0240216 A1 * | 12/2004 | Basey ........ 362/429 |

FOREIGN PATENT DOCUMENTS

| | | |
|---|---|---|
| DE | 350 03 319 | 4/1986 |
| DE | 203 05 065 U1 | 5/2003 |
| FR | 2604132 | 3/1988 |
| WO | WO 02/47941 | 6/2002 |

* cited by examiner

*Primary Examiner*—Georgia Y Epps
*Assistant Examiner*—Kevin Wyatt
(74) *Attorney, Agent, or Firm*—Notaro, Michalos & Zaccaria P.C.

(57) ABSTRACT

A lamp mount system for high voltage projector lamps includes only a few parts which fit together without the need for connecting hardware. A single piece clip snaps into a single piece lamp mount and, together with the lamp form a lamp mounting assembly. The lamp mounting assembly in turn slidably engages with a single piece lamp base. The lamp mount assembly may be slideably removed when the lamp burns out.

18 Claims, 4 Drawing Sheets

LAMP MOUNT SYSTEM FOR PROJECTOR LAMPS WITH MOUNT PIECE AND CLIPS

CROSS-REFERENCE TO RELATED APPLICATION

This application claims priority on U.S. Provisional Patent Application 60/818,649 filed Jul. 5, 2006, which is incorporated here by reference.

BACKGROUND OF THE INVENTION

1. Field of the Invention

This invention relates to lamp mount system for high voltage lamps in illumination systems such as projectors.

2. Description of Related Art

An optical assembly to produce illumination for a projection system has several optical elements to accept and shape and relay the light from a lamp. Therefore the accurate positioning of the lamp with respect to these optical elements is mandatory. Because of the nature of the operation of an arc lamp, there is an issue with lifetime. This means that many illumination systems that use arc lamps will need to have the lamp replaced at least once.

Prior mounting systems for lamps in projection systems generally include many elements, such as springs, wire guides and connecting screws. While such systems work well for retaining the lamp, they are unnecessarily complicated to manufacture and require too much time and effort to assemble or to remove a burned out lamp and insert a new one.

A need remains in the art for a lamp mount system for projectors, having only a few parts which snap together without the need for connecting hardware.

SUMMARY

An object of the present invention is to provide a lamp mount system for projectors, having only a few parts which snap together without the need for connecting hardware. This is accomplished by assembling, outside the projector, a lamp mounting assembly which comprises a lamp mount piece, the lamp and a clip. The lamp is inserted between the lamp mount piece and the clip, and the lamp mount piece and the clip snap together to form the lamp mounting assembly. The lamp mounting assembly is then inserted into the projector as a unit.

Preferably the clip is formed using a single piece of sheet metal. Preferably the lamp mount piece is formed of a single element of injection molded plastic.

The lamp mount piece comprises means for accurately positioning and fixing the lamp perpendicular to the optical axis. For example the lamp mount piece could include integrated preload features which flex away as the lamp is inserted and bias inward to hold the lamp in place in the mounting assembly.

The lamp mount piece (which now forms part of the lamp mounting assembly), in turn engages with a lamp base which fits into the projector. Preferably the lamp base is formed of a single element of injection molded plastic.

Rails on the lamp mount piece slide into channels on the lamp base, and a flexing integral arm on the lamp base holds the mounting assembly in place. No further connection hardware or separate biasing elements are required.

In order to replace the lamp, the inventive lamp mounting assembly can be easily slid out of the projector if the integral arm is bent. This results in a simple means of replacing lamps while some accuracy of alignment is maintained.

Another benefit of the simplified assembly is that the cost of the assembly is also reduced by using fewer parts and reducing the assembly time required.

DETAILED DESCRIPTION OF THE PREFERRED EMBODIMENTS

The reference numbers below and their associated elements are used in the figures and specification:

| Reference number | Element |
| --- | --- |
| 102 | Clip |
| 104 | Lamp |
| 106 | Lamp mount piece |
| 108 | Locking Tabs |
| 110 | Stirrups |
| 111 | Top inside edge of stirrups |
| 112 | Preloads |
| 113 | Side walls with preloads (side walls) |
| 114 | Protrusion |
| 115 | Top and bottom walls (end walls) |
| 116 | Lamp mounting assembly |
| 117 | Top and bottom clip flaps (end flaps) |
| 118 | Side clip flaps (side flaps) |
| 120 | Lamp base |
| 122 | Channels |
| 124 | Guide Rails |
| 126 | Locking arm |
| 128 | Interlock recess |
| 130 | Arms - protrusion |
| 132 | Lip |

Figure 1:
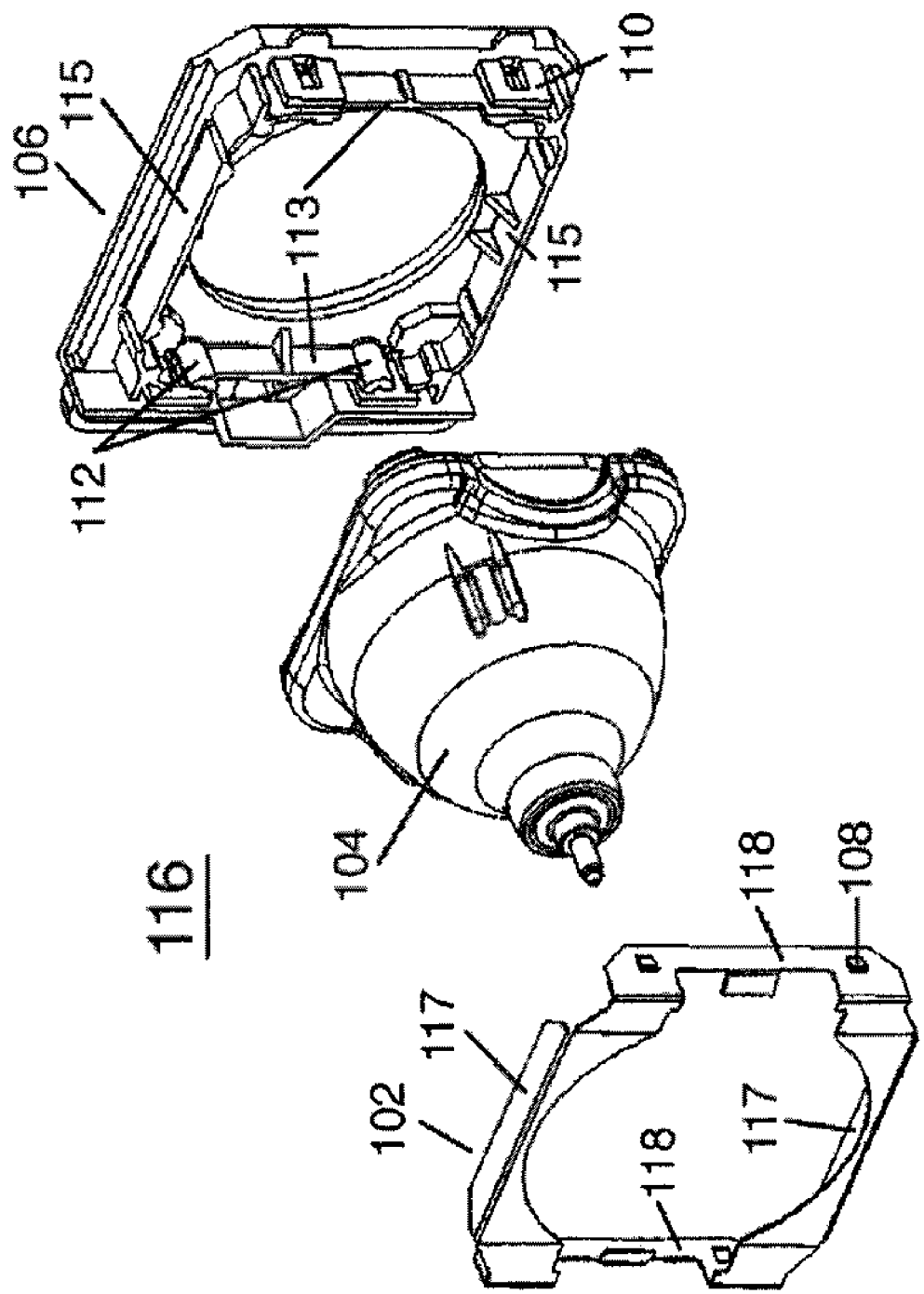
FIG. 1 is an exploded isometric view of the lamp mounting assembly comprising a lamp mount piece, a clip and a lamp.

FIG. 1 is an exploded isometric view of the lamp mounting assembly 116 of the lamp mount of the present invention. The lamp mounting assembly 116 comprises a single sheet metal lamp clip 102 which snaps onto a lamp mount piece 106 via locking tabs 108 and stirrups 110, holding lamp 104 in place. Clip 102 includes side clip flaps 118 having locking tabs 108, and also includes top and bottom flaps 117 without tabs (note that "top" and "bottom" as used in this description specify top and bottom in the figure described, rather than actual orientations in, for example, a projector). Lamp mount piece 106 includes side walls 113 with preload elements 112, and also includes top and bottom walls 115 without preloads. Stirrups 110 are placed outside of preload walls 113. The lamp mounting assembly is shown assembled in FIG. 3. Locking tabs 108 on clip 102 slide under and into stirrups 110 on lamp mount piece 106. Tabs 108 are biased inward as they are inserted, and then snap open within stirrups 110 to hold the assembly together. Lamp mount piece 106 includes preload features 112 on side preload walls 113 (better shown in FIG. 2) which hold the lamp 104 in place.

Figure 2:
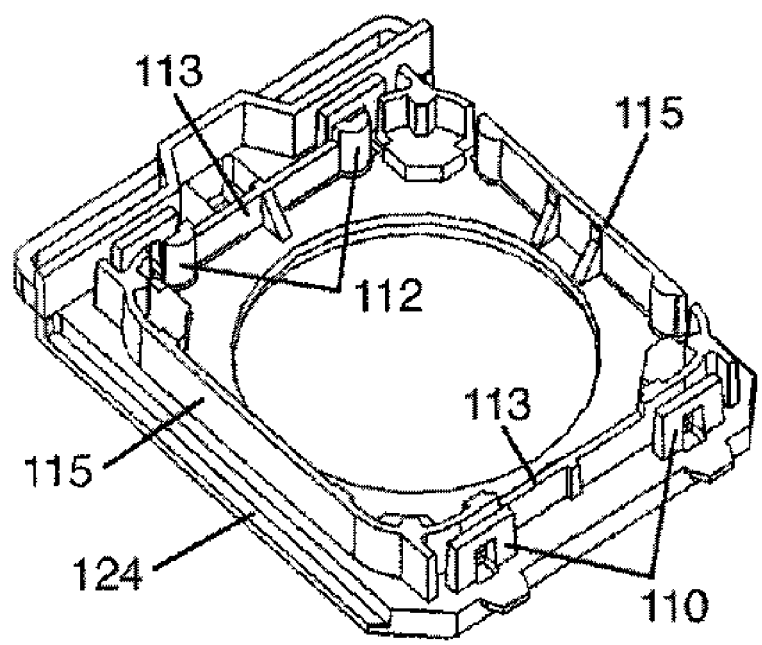
FIG. 2 is an isometric view of the lamp mount piece of the lamp mounting assembly portion of FIG. 1.

FIG. 2 is an isometric view of the lamp mount piece 106 of the lamp mounting assembly 116 of FIG. 1. In the preferred embodiment, lamp mount piece 106 is a single injection molded piece of plastic. Preload features 112 are molded into side walls 113 and flex away as lamp 104 is inserted. The structure of stirrups 110 is better shown in this figure, because the spaces in preload walls 113 into which clip 102 side walls 118 with tabs 108 slide are more visible.

Figure 3:
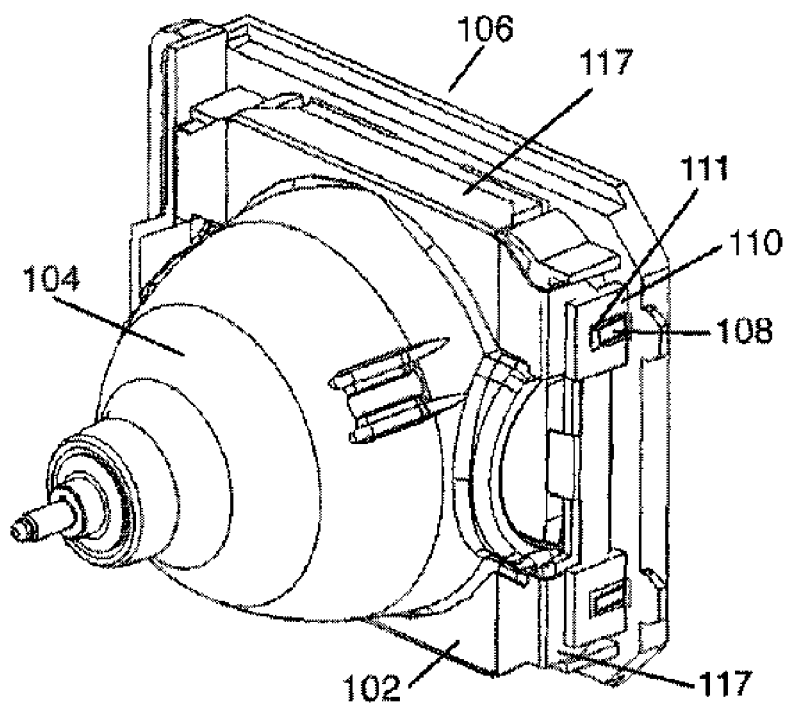
FIG. 3 is an isometric view of the lamp mounting assembly of FIG. 1, shown assembled.

FIG. 3 is an isometric view of the lamp mounting assembly 116 of FIG. 1, shown assembled. Tabs 108 have sprung back outward after insertion, and catch on the top inside edges 111 of stirrups 110, preventing clip 102, and hence lamp 104 from separating from lamp mount piece 106. Side flaps 118 slide outside of preload walls 113 (but inside stirrups 110). Top and bottom flaps 117 slide outside top and bottom walls 118.

Figure 4:
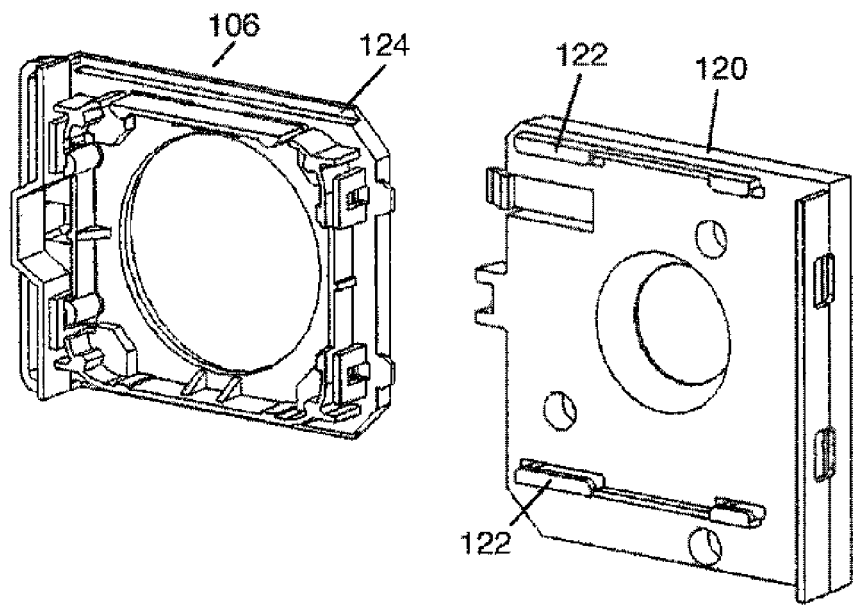
FIG. 4 is an isometric view of the lamp mounting assembly and the corresponding lamp base, shown separated, from the lamp side.
Figure 4A:
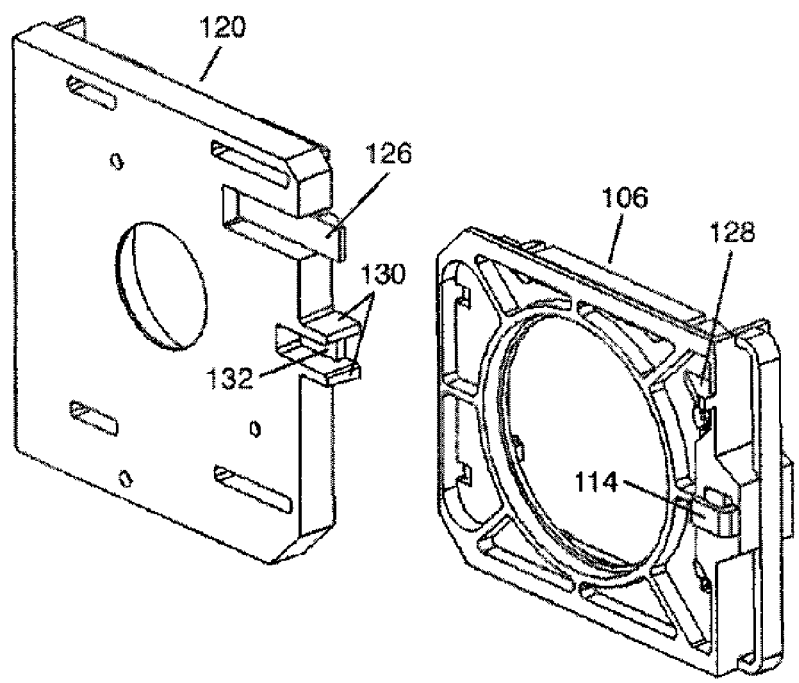
FIG. 4A shows the separated elements of FIG. 4 from the reverse angle.
Figure 5:
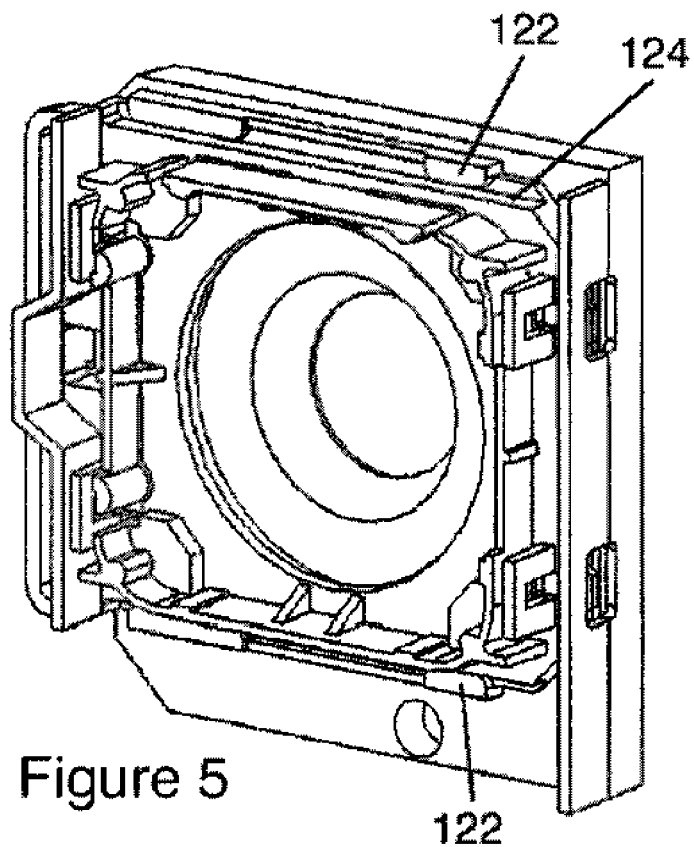
FIG. 5 is an isometric view of the lamp mounting assembly and the corresponding lamp base, shown assembled from the lamp side (without the lamp).
Figure 5A:
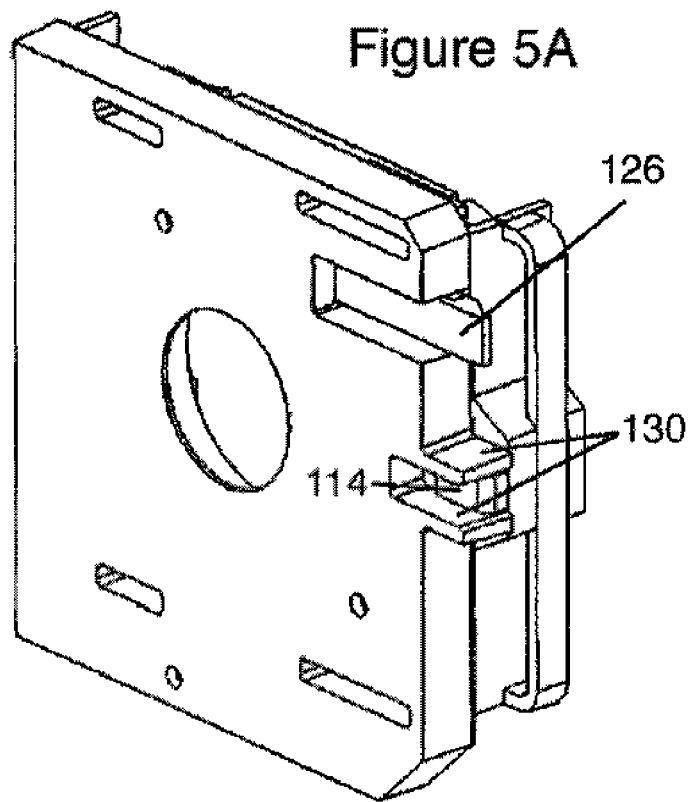
FIG. 5A shows the assembled elements of FIG. 5 from the reverse angle.

FIGS. 4, 4A, 5 and 5A show how the lamp mounting assembly 116 is engaged with lamp base 120. For clarity in these figures the lamp 104 as well as the clip 102 are not shown. In practice, the entire lamp mounting assembly 116, comprising clip 102, lamp 104 and lamp mount piece 106, would be engaged with lamp base 120. FIG. 4 and FIG. 4A are isometric views of the lamp mounting assembly 116 and the lamp base 120 shown separated. FIG. 4 is a view from the lamp side and FIG. 4A is a view from the opposite side (both without lamp 104, for clarity). FIG. 4A is an isometric view of the lamp mounting assembly 116 and the lamp base 120 shown separated but from the other side. FIG. 5 and FIG. 5A are isometric views of the lamp mounting assembly 116 and lamp base 120 shown assembled (both without lamp 104, for clarity). FIG. 5 is a view from the lamp side and FIG. 5A is a view from the opposite side.

Guide rails 124 slide into channels 122 (with assembly 116 in front of base 120 in FIG. 4). Locking flexible arm 126 snaps over interlock tab 128 (shown in FIG. 4A) and holds the mounting assembly in place until arm 126 is deflected away from interlock tab 128 by pushing it away. In addition, arms 130 on lamp base 120 bracket finger protrusions 114 (shown in FIG. 4A) on assembly 116 when the elements are engaged (see FIGS. 5 and 5A) for additional stability. Arms 130 guide protrusion 114 in as it is inserted, and prevent sideways motion when assembled. Also in addition, finger protrusion 114 engages with lip 132 on lamp base 120 to create a preload. Lamp base 120 is preferably injection molded as one piece of plastic, and requires no additional hardware.

Lamp replacement is quick and easy and requires no tools. Locking arm 126 is pushed away from interlock tab 128. Assembly 116 slides apart from lamp base 120, via rails 124 sliding within channels 122.

Note that the methods of supplying electricity to lamp 104 are convention and well known and are not shown here. For example, the electrical connection could be made manually, via a cord with connector. Or, the electrical connector could be built into the projector, with the lamp engaging with the connector as it slides into place.

Note that FIGS. 1-5A illustrate a particular embodiment of the invention for a specific use. For example, the aperture in lamp base 120 is smaller than the aperture in lamp mount piece 106. This is because lamp mount piece 106 is envisioned as a universal part for use in a variety of projectors, while the particular lamp base 120 of FIGS. 4-5A is used in a device requiring a smaller aperture.

The invention claimed is:

1. A lamp mount system for projector lamps comprising:
   a lamp mounting assembly and a lamp base adapted to be fixed to a projector;
   the lamp mounting assembly comprising a lamp mount piece, a lamp and a clip;
   the lamp being fixed between the lamp mount piece and the clip and the lamp mount piece and the clip comprising connecting means for connecting the lamp mount piece and the clip by a snap mechanism thereby at least contributing to firmly holding the lamp;
   the lamp base and the lamp mounting assembly further comprising means for fixing the lamp mounting assembly in a removable manner to the lamp base, wherein the clip has an aperture for receiving at least part of the lamp, the clip comprising opposite end flaps and opposite side flaps, the lamp mount piece having an aperture, opposite end walls and opposite side walls, the opposite end flaps and the opposite side flaps of the clip being engaged over the respective opposite end walls and opposite side walls of the lamp mount piece, the connecting means for connecting the lamp mount piece and the clip comprising at least one locking tab on each side flap and a stirrup adjacent each side wall for receiving each locking tab to form the snap mechanism and to lock the clip to the lamp mount piece for firmly holding the lamp.

2. A lamp mount system according to claim 1, wherein each of the opposite side walls including at least one inner preload element for firmly engaging against the lamp.

3. A lamp mount system according to claim 1, wherein the lamp base has a pair of channels and the lamp mount piece has a pair of guide rails for being slidably received in the channels for engaging the lamp mounting assembly to the lamp base.

4. A lamp mount system according to claim 1, wherein the lamp base has a pair of channels and the lamp mount piece has a pair of guide rails for being slidably received in the channels for engaging the lamp mounting assembly to the lamp base, the means for fixing the lamp mounting assembly in a removable manner to the lamp base comprising a flexible locking arm on one of the lamp base and lamp mount piece, and an interlock recess on the other of the lamp base and lamp mount piece for removably locking to the locking arm.

5. A lamp mount system according to claim 1, wherein the lamp base has an aperture therein that is smaller than the aperture in the lamp mount piece, the lamp base being made of one piece of injection molded plastic and having a pair of channels, the lamp mount piece being made of one piece of injection molded plastic and having a pair of guide rails for being slidably received in the channels for engaging the lamp mounting assembly to the lamp base, the means for fixing the lamp mounting assembly in a removable manner to the lamp base comprising a flexible locking arm on one of the lamp base and lamp mount piece, and an interlock recess on the other of the lamp base and lamp mount piece for removably locking to the locking arm.

6. A lamp mount system according to claim 1, the lamp base having a pair of channels and the lamp mount piece having a pair of guide rails for being slidably received in the channels for engaging the lamp mounting assembly to the lamp base.

7. A lamp mount system for projector lamps comprising:
   a lamp mounting assembly and a lamp base adapted to be fixed to a projector;
   the lamp mounting assembly comprising a lamp mount piece, a lamp and a clip;
   the lamp being fixed between the lamp mount piece and the clip and the lamp mount piece and the clip comprising connecting means for connecting the lamp mount piece and the clip by a snap mechanism thereby at least contributing to firmly holding the lamp;

the lamp base and the lamp mounting assembly further comprising means for fixing the lamp mounting assembly in a removable manner to the lamp base, wherein the clip is made of one piece and has an aperture for receiving at least part of the lamp, the clip comprising opposite end flaps and opposite side flaps, the lamp mount piece being made of one piece of injection molded plastic and having an aperture, opposite end walls and opposite side walls, the opposite end flaps and the opposite side flaps of the clip being engaged over the respective opposite end walls and opposite side walls of the lamp mount piece, the connecting means for connecting the lamp mount piece and the clip comprising at least one locking tab on each side flap and a stirrup adjacent each side wall for receiving each locking tab to form the snap mechanism and to lock the clip to the lamp mount piece for firmly holding the lamp.

8. A lamp mount system according to claim 7, wherein the opposite side flaps are perpendicular to the opposite end flaps, the opposite side walls are perpendicular to the opposite end walls and each of the opposite side walls including a pair of spaced apart preload elements for firmly engaging against the lamp.

9. A lamp mount system according to claim 7, wherein the opposite side flaps are perpendicular to the opposite end flaps, the opposite side walls are perpendicular to the opposite end walls, and each of the opposite side walls including a pair of spaced apart preload elements for firmly engaging against the lamp, the lamp base having an aperture therein that is smaller than the aperture in the lamp mount piece, the lamp base being made of one piece of injection molded plastic and having a pair of channels, the lamp mount piece being made of one piece of injection molded plastic and having a pair of guide rails for being slidably received in the channels for engaging the lamp mounting assembly to the lamp base, the means for fixing the lamp mounting assembly in a removable manner to the lamp base comprising a flexible locking arm on one of the lamp base and lamp mount piece, and an interlock recess on the other of the lamp base and lamp mount piece for removably locking to the locking arm.

10. A lamp mount system according to claim 7, wherein the lamp base has a pair of channels and the lamp mount piece has a pair of guide rails for being slidably received in the channels for engaging the lamp mounting assembly to the lamp base.

11. A lamp mount system according to claim 7, wherein the lamp base has a pair of channels and the lamp mount piece has a pair of guide rails for being slidably received in the channels for engaging the lamp mounting assembly to the lamp base, the means for fixing the lamp mounting assembly in a removable manner to the lamp base comprising a flexible locking arm on one of the lamp base and lamp mount piece, and an interlock recess on the other of the lamp base and lamp mount piece for removably locking to the locking arm.

12. A lamp mount system according to claim 7, wherein the lamp base has an aperture therein that is smaller than the aperture in the lamp mount piece, the lamp base being made of one piece of injection molded plastic and having a pair of channels, the lamp mount piece being made of one piece of injection molded plastic and having a pair of guide rails for being slidably received in the channels for engaging the lamp mounting assembly to the lamp base, the means for fixing the lamp mounting assembly in a removable manner to the lamp base comprising a flexible locking arm on one of the lamp base and lamp mount piece, and an interlock recess on the other of the lamp base and lamp mount piece for removably locking to the locking arm.

13. A lamp mount system according to claim 7, each of the opposite side walls including a pair of spaced apart preload elements for firmly engaging against the lamp.

14. A lamp mount system according to claim 7, each of the opposite side walls including a pair of spaced apart preload elements for firmly engaging against the lamp, the lamp base having an aperture therein that is smaller than the aperture in the lamp mount piece, the lamp base being made of one piece of injection molded plastic and having a pair of channels, the lamp mount piece being made of one piece of injection molded plastic and having a pair of guide rails for being slidably received in the channels for engaging the lamp mounting assembly to the lamp base, the means for fixing the lamp mounting assembly in a removable manner to the lamp base comprising a flexible locking arm on one of the lamp base and lamp mount piece, and an interlock recess on the other of the lamp base and lamp mount piece for removably locking to the locking arm.

15. A lamp mount system for projector lamps comprising:

a lamp mounting assembly and a lamp base adapted to be fixed to a projector;

the lamp mounting assembly comprising a lamp mount piece, a lamp and a clip;

the lamp being fixed between the lamp mount piece and the clip and the lamp mount piece and the clip comprising connecting means for connecting the lamp mount piece and the clip by a snap mechanism thereby at least contributing to firmly holding the lamp;

the lamp base and the lamp mounting assembly further comprising means for fixing the lamp mounting assembly in a removable manner to the lamp base, wherein the clip has an aperture for receiving at least part of the lamp, the clip comprising opposite end flaps and opposite side flaps that are perpendicular to the opposite end flaps, the lamp mount piece having an aperture, opposite end walls and opposite side walls that are perpendicular to the opposite end walls, the opposite end flaps and the opposite side flaps of the clip being engaged over the respective opposite end walls and opposite side walls of the lamp mount piece, the connecting means for connecting the lamp mount piece and the clip comprising at least one locking tab on each side flap and a stirrup adjacent each side wall for receiving each locking tab to form the snap mechanism and to lock the clip to the lamp mount piece for firmly holding the lamp.

16. A lamp mount system according to claim 15, wherein the lamp base has a pair of channels and the lamp mount piece has a pair of guide rails for being slidably received in the channels for engaging the lamp mounting assembly to the lamp base.

17. A lamp mount system according to claim 15, wherein the lamp base has a pair of channels and the lamp mount piece has a pair of guide rails for being slidably received in the channels for engaging the lamp mounting assembly to the lamp base, the means for fixing the lamp mounting assembly in a removable manner to the lamp base comprising a flexible locking arm on one of the lamp base and lamp mount piece, and an interlock recess on the other of the lamp base and lamp mount piece for removably locking to the locking arm.

18. A lamp mount system according to claim 15, wherein the lamp base has an aperture therein that is smaller than the aperture in the lamp mount piece, the lamp base being made of one piece of injection molded plastic and having a pair of channels, the lamp mount piece being made of one piece of injection molded plastic and having a pair of guide rails for being slidably received in the channels for engaging the lamp mounting assembly to the lamp base, the means for fixing the lamp mounting assembly in a removable manner to the lamp base comprising a flexible locking arm on one of the lamp base and lamp mount piece, and an interlock recess on the other of the lamp base and lamp mount piece for removably locking to the locking arm.

* * * * *